Patented Feb. 13, 1940

2,189,890

UNITED STATES PATENT OFFICE 2,189,890

PRODUCTION OF UNSATURATED HALO-GEN-CONTAINING COMPOUNDS

William Engs, Oakland, Herbert P. A. Groll, Berkeley, and Alasdair W. Fairbairn, Oakland, Calif., assignors to Shell Development Company, San Francisco, Calif., a corporation of Delaware No Drawing. Application May 14, 1937, Serial No. 142,664

7 Claims. (Cl. 260—654)

This invention relates to the production of desirable unsaturated polyhalides by the halo-substitution, such as with chlorine or bromine, of unsaturated halogen-containing aliphatic organic compounds possessing at least three carbon atoms in the molecule.

Our invention relates further to the production of polyhalides which contain an unsaturated tertiary carbon atom in the molecule by the halo-substitution, such as with chlorine or bromine, of unsaturated halogen-containing aliphatic organic compounds possessing an unsaturated tertiary carbon atom. By an unsaturated tertiary carbon atom is meant a carbon atom which is linked by four bonds to three other carbon atoms.

Further, our invention is concerned with the production of halogen-containing diolefinic compounds from such unsaturated halides as are structurally capable of further unsaturation. In order that an olefinic compound be capable of further unsaturation, i. e. have more ethylene linkages, it must contain at least three carbon atoms and must have at least two replaceable hydrogen atoms distributed on two contiguous carbon atoms, only one of which may be unsaturated.

We have discovered that relatively high yields of unsaturated halides, of the types mentioned heretofore, may be obtained if certain rules of procedure are observed.

We have found that in order to halogenate aliphatic unsaturated halogen-containing compounds by substitution, it is necessary, if practical yields are to be obtained, to execute the halogenation under different conditions, especially as regards temperature and reaction time, depending upon the material being subjected to halogenation. We have also found that the difference in behavior in this respect of the various unsaturated halogen-containing compounds is largely dependent upon the linkage of the unsaturated carbon atoms and to a minor extent upon the position of the halogen atom or atoms with respect to the ethylene group.

For convenience, the field of available unsaturated aliphatic halides may be divided into two groups. By an unsaturated aliphatic halide is meant a halogen-containing compound of non-aromatic structure which contains an ethylene linkage and may contain one or more of the radicals of the group consisting of hydroxy, alkoxy, carbalkoxy, carbonyl, amino and the like.

Group I consists of aliphatic halides possessing an unsaturated tertiary carbon atom. Representative examples of this group are:

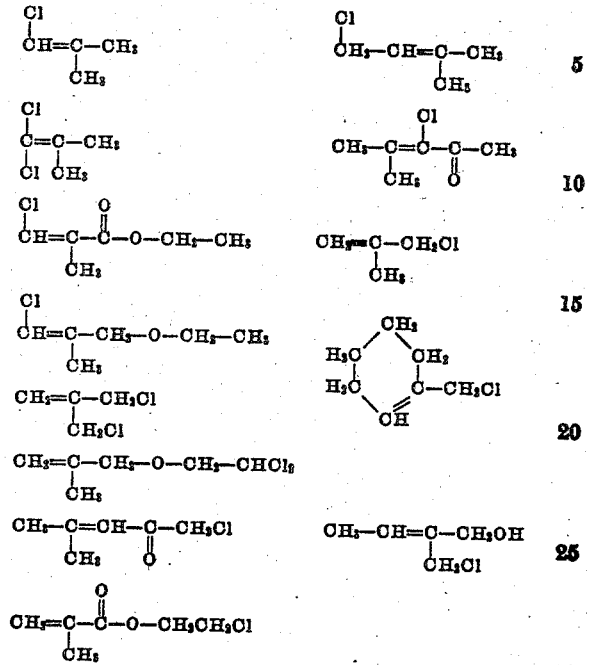

Group II consists of unsaturated aliphatic halides possessing at least three carbon atoms in an aliphatic chain and having an ethylene linkage between two normal carbon atoms. Representative examples of this group are:

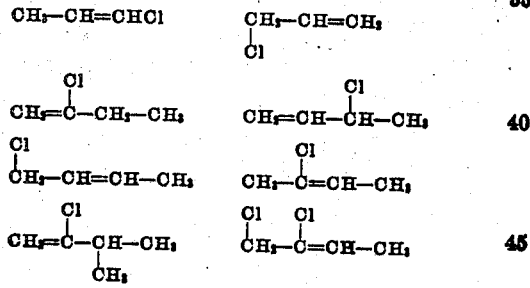

We have found that such compounds as belong to Group I, i. e. have an unsaturated tertiary carbon atom, may conveniently be halogenated by substitution at quite low temperatures. Thus when operating with members of this group it is practical to execute the halogenation in the liquid phase. A gradual decrease in the yield of unsaturated halides upon raising the temperature led us to the belief that the optimum temperature for the substitution reaction when dealing with compounds of this group was quite low. In spite of the ease with which the carbon skeletons of such compounds are known to rupture at elevated temperatures, especially in the presence of such a cracking promoter as free chlorine, we have found that by using sufficiently short reaction times the vapor phase halo-substitution of such compounds can generally be economically executed at quite high temperatures. Thus, for example, by reducing the reaction time to less than one second we have been able to obtain a 76 mol percent yield of dichlorisobutene by chlorine substitution of isobutenyl chloride in the vapor phase at a temperature of about 150° C.

We have found that such compounds as belong to Group II differ markedly from those of Group I in that at low or slightly elevated temperatures they react with free halogen to give saturated halides, i. e. they react by addition rather than by substitution. We have found however, that such compounds as are members of Group II may be conveniently halogen substituted at more elevated temperatures. When operating with such compounds we execute the reaction in the vapor phase at a temperature above about 250° C. and preferably at about 400–500° C. By using sufficiently short reaction times we have been able to execute the reaction at still higher temperatures without excessive rupture of the carbon skeleton.

We have further found that, in general, such compounds belonging to Group I or II, as are structurally capable, react in still a different manner at quite elevated temperatures to form halogen-containing diolefines. Thus, for example, when chlorinating 2-chlorbutene-2 at about 350° C. the main reaction product was 1,2-dichlorbutene-2. When chlorinating the same compound (2-chlorbutene-2) at about 515° C. the main reaction products were chlordiolefines.

The minimum temperature at which diolefine formation takes place, being governed by the structure of the carbon skeleton, the position of the ethylene linkage and the position and number of halogen atoms present, is dependent upon the material being subjected to treatment and is, for example, in the case of the formation of 2-chlorbutadiene 1-3 from 2-chlorbutene-2 at about 360° C. Higher temperatures favor the formation of the halogen-containing diolefines. Temperatures high enough to cause excessive rupture of the carbon skeleton should be avoided.

Since the reaction time and temperature employed are interrelated it is obvious that from such a starting material as is structurally capable of further unsaturation it is generally possible to obtain as the predominant product a mono-olefine polyhalide or a halogen-containing diolefine depending upon the conditions prevailing. Thus, if, for example, when operating under conditions such that the predominant product is a mono-olefinic polyhalide the temperature be raised appreciably, the product will be found to be richer in diolefinic products according to the temperature increase. Maintaining this new increased temperature it is generally possible to counteract the increase by lowering the reaction time, in which case a product comparable to that obtained under the first conditions will again be obtained.

Summarizing it is seen that the available compounds are divided into groups having different molecular configurations which are preferably reacted within different temperature ranges. The overlapping of the effective temperature ranges, especially in regard to the upper limit is due to the variation of individual members of the groups and to the effect of the time of reaction. We have found that in general the optimum temperature is somewhat dependent upon the time of reaction and that with very short times of reaction quite high temperatures may in many cases be successfully employed. Reaction times of less than 60 seconds are preferable but longer reaction times may be practical in some cases, especially when operating near the lower limit of temperature range.

The reactions involved are exothermic and although not nearly as liable to explosion and flaming as the halo-substitution of olefines there often exists a tendency to flame. This is overcome by maintaining a lineal velocity of reactants above that of the speed of flame propagation.

Since the requisite time of reaction is usually quite short it is important in such cases where the reaction is preferably carried out at elevated temperatures to preheat the reactants separately before mixing. If it is attempted to heat the mixed reactants to the desired temperature, it is found that undesirable reactions, such as halogen addition, take place to a substantial extent before the desired temperature is reached.

The mol ratio of halogen to unsaturated halogen compound is preferably kept at about 1:1.5–2.5 but may vary considerably depending upon the material being halogenated. Higher ratios in general lower the yields, and lower ratios lower the production capacity.

Although we prefer to execute the invention in a continuous manner, batch or intermittent methods of execution are applicable.

Any of the halogenation catalysts, such as halides of iron, antimony, tin, phosphorus, aluminum, barium, etc., or metallic iron, sulfur or active carbon or the like may be used to accelerate the halogen substitution. The reaction may be accelerated photochemically, in which case, reaction tubes of silica or glass which permit the passage of light of effective wave lengths may be used.

Inert diluents, such as nitrogen, etc., may be present in the reaction system. Such diluents, when used moderately, may facilitate temperature control.

The following examples are presented solely to illustrate suitable applications of our invention and modes of executing the same, and they are not to be considered as limiting the scope of the invention as to the reactants, mode of execution, reaction conditions and the like.

*Example I.*—A measured and controlled flow of commercial chlorine was mixed with a measured and controlled descending stream of isobutenyl chloride at room temperature in a forked tube. The mol proportion of chlorine to isobutenyl chloride was maintained at about 1:1.53. The mixed reactants passed into a pyrex glass tube of such size that the time of residence was less than one second wherein the heat of reaction vaporized the isobutenyl chloride. The reacted vapor mixture passed to a scrubbing tower and then to a separator where the product which is heavier than water was removed from the bottom. The unreacted isobutenyl chloride was recovered. The reacted products from the chlorination of 55 gallons of isobutenyl chloride contained about 77% of dichlor-isobutylenes, which were recovered by fractional distillation.

*Example II.*—A stream of 2-chlorbutene-2 at about 266° C. and a stream of chlorine at about 276° C. were mixed in a glass jet in a mol ratio of about 1.75:1. The mixture was immediately passed through a carbon tube heated to about 515° C. The condensed reaction products were washed with water, dried and fractionated. The main reaction product was 2-chlorbutadiene-1-3 (chloroprene) with 1,3-dichlorbutene and some 1,2-dichlorbutene.

*Example III.*—2-chlorbutene-2 was chlorinated at a temperature of about 350° C. with a mol ratio of chlorine to chlorbutene of about .75:1. Analysis of the product showed it to contain about 50% of unsaturated dichlorides mainly 1,2-dichlorbutene-2.

The products formed through the use of our process are useful since they lend themselves particularly to direct synthesis of such valuable materials as for example isoerythritol, unsaturated chlorhydrins, etc. The products from Example II, for example, are useful in the field of synthetic rubber, synthetic resins, etc. Not only are the products obtainable by our invention useful as intermediates, but they have innumerable applications per se, as for example, solvents for cellulose esters, certain resins, fats, waxes, etc. Some of the products have potential uses based on their toxic qualities.

While we have described our invention in a detailed and comprehensive manner and provided specific examples of executing the same, it is to be understood that modifications may be made and that no limitations other than those imposed by the scope of the claims are intended.

We claim as our invention:

1. A process for the production of an unsaturated aliphatic polyhalide which comprises reacting a free halogen selected from the group consisting of chlorine and bromine with an aliphatic halide possessing an unsaturated tertiary carbon atom, effecting said reaction for a period of time less than one minute at a temperature at which the halo-substitution product is predominantly in the vapor phase, but below the temperature at which there occurs a substantial formation of halides having a greater number of unsaturated bonds than present in the unsaturated halide reactant, and removing from the reaction system vapors of an unsaturated aliphatic halide which contains more halogen atoms than the unsaturated halide subjected to treatment.

2. A process for the production of an unsaturated aliphatic polyhalide which comprises reacting a halogen selected from the group consisting of chlorine and bromine with an aliphatic halide selected from the group consisting of aliphatic chlorides and bromides possessing an unsaturated tertiary carbon atom, effecting the reaction for a period of time less than one minute at a temperature at which the halo-substitution product is predominantly in the vapor phase, but below the temperature at which there occurs a substantial formation of halides having a greater number of unsaturated bonds than present in the unsaturated halide reactant, and removing from the reaction system vapors of an unsaturated aliphatic halide which contains more halogen atoms than the unsaturated halide subjected to treatment.

3. A process for the production of an unsaturated aliphatic polyhalide which comprises reacting an unsaturated tertiary carbon atom-containing aliphatic halide selected from the group consisting of aliphatic chlorides and bromides, with the corresponding halogen for a reaction time of less than one minute at a temperature at which the halo-substitution product is predominantly in the vapor phase, but below the temperature at which there occurs a substantial formation of halides possessing a greater number of unsaturated bonds than present in the unsaturated halide reactant, and removing from the reaction system vapors of an unsaturated aliphatic halide which contains more halogen atoms than the unsaturated halide subjected to treatment.

4. A process for the production of an unsaturated aliphatic dihalide which comprises reacting a halogen selected from the group consisting of chlorine and bromine with an aliphatic hydrocarbon monohalide possessing an unsaturated tertiary carbon atom, effecting the reaction for a period of time less than one minute at a temperature at which the dihalo-substitution product is predominantly in the vapor phase, but below the temperature at which there occurs a substantial formation of halides having a greater number of unsaturated bonds than present in the unsaturated monohalide reactant, and removing from the reaction system an unsaturated aliphatic hydrocarbon dihalide.

5. A process for the production of an unsaturated aliphatic dihalide which comprises reacting a halogen selected from the group consisting of chlorine and bromine with an aliphatic hydrocarbon monohalide selected from the group consisting of aliphatic monochlorides and monobromides possessing an unsaturated tertiary carbon atom, effecting the reaction for a period of time less than one minute at a temperature at which the dihalo-substitution product is predominantly in the vapor phase, but below the temperature at which there occurs a substantial formation of dihalides having a greater number of unsaturated bonds than are present in the unsaturated monohalide reactant, and removing from the reaction system an unsaturated aliphatic hydrocarbon dihalide.

6. A process for the production of a dihaloisobutene which comprises reacting an isobutenyl monohalide with free halogen selected from the group consisting of chlorine and bromine, at a temperature at which the dihaloisobutene is predominantly in the vapor phase, for a reaction time less than one minute, and removing from the reaction system vapors of a dihaloisobutene.

7. A process for the production of a dichloroisobutene which comprises reacting isobutenyl chloride with free chlorine at a temperature at which the dichloro-substitution product is predominantly in the vapor phase, for a reaction time less than one minute, whereby side reactions are substantially obviated, and removing dichloroisobutene from the reaction system.

WILLIAM ENGS.
HERBERT P. A. GROLL.
ALASDAIR W. FAIRBAIRN.